United States Patent [19]

Schumacher et al.

[11] Patent Number: 5,627,221

[45] Date of Patent: May 6, 1997

[54] PROCESS FOR PRODUCTION OF LOW DENSITY WATER-BLOWN RIGID FOAMS WITH FLOW AND DIMENSIONAL STABILITY

[75] Inventors: Donald W. Schumacher, Antioch; George Magnus, Arlington Heights; Joanne M. Moster, Chicago, all of Ill.

[73] Assignee: Stepan Company, Northfield, Ill.

[21] Appl. No.: 441,124

[22] Filed: May 15, 1995

Related U.S. Application Data

[63] Continuation of Ser. No. 222,073, Apr. 4, 1994, Pat. No. 5,240,169, which is a continuation of Ser. No. 937,052, Aug. 27, 1992, abandoned.

[51] Int. Cl.$^6$ .............................. C08G 18/32; C08G 18/34
[52] U.S. Cl. .................................................. 521/173
[58] Field of Search ................................. 521/173

[56] References Cited

U.S. PATENT DOCUMENTS 3,467,605 9/1969 Abercrombie et al. ............... 521/173

*Primary Examiner*—Morton Foelak
*Attorney, Agent, or Firm*—McDonnell Boehnen Hulbert & Berghoff

[57] ABSTRACT

The invention provides a methods for making water-blown closed cell rigid foams comprising using as a polymer base a polyol selected from the group consisting of:

(a) a polyester polyol with an average functionality of at least 1.6 and an OH value of at least 200; and (b) a polyether polyol with an average functionality of at least 2 and an OH value of at least 200.

The invention also provides water-blown closed cell rigid foams comprising a polymer base selected from the group consisting of:

(a) a polyester polyol with an average functionality of at least 1.6 and an OH value of at least 200; and (b) a polyether polyol with an average functionality of at least 2 and an OH value of at least 200.

19 Claims, No Drawings

PROCESS FOR PRODUCTION OF LOW DENSITY WATER-BLOWN RIGID FOAMS WITH FLOW AND DIMENSIONAL STABILITY

This is a continuation of application Ser. No. 08/222,073 filed Apr. 4, 1994, now U.S. Pat. No. 5,240,169 which is a continuation of application Ser. No. 08/937,052, filed Aug. 27, 1992, now abandoned.

BACKGROUND OF THE INVENTION

1. Field of the Invention

This invention is in the field of water-blown foams and the method for production of such foams.

2. Description of the Prior Art

U.S. Pat. No. 5,010,116 describes a water-blown foam consisting of a mixture of polyether polyols, amine, organometallic and triazine/quaternary ammonium salt catalysts, surfactant, and 0.4%–4.0% water reacted with diphenylmethane diisocyanate. Although the density of the foam is not indicated, it would be expected that a free rise density of at least 1.8 lbs./ft.$^3$ would be obtained with a formulation containing 4.0% water.

U.S. Pat. No. 5,070,115 describes the process for producing a rigid foam from reacting an organic isocyanate with a mixture consisting of a polyester polyol with an OH value of at least 150, and/or a polyether polyol with an OH value of at least 200 which is combined with a polyether with an OH value less than 100. An NCO/OH ratio of 100–130 is used. The foam may have a density between 1.25 and 12.5 lbs./ft.$^3$ The examples cited use 4.0 parts of water and have densities ranging from 2.05 to 2.75 lbs./ft.$^3$ European Patent Application No. 450,197 A1 describes foam formulations suitable for preparing water-blown heat-insulating material using polyols as softening point improvers and heat-insulating material obtained therefrom.

European Patent Application No. 408,408 describes methods of producing rigid urethane foam by reacting blend polyol with polyisocyanate and water as blowing agent.

Because several fully halogenated hydrocarbons (chlorofluorocarbons, commonly referred to as CFC's) normally used as blowing agent are believed to cause environmental problems (for instance, their role in the deterioration of the stratospheric ozone layer), there is much effort in research for developing an alternative blowing agent that may (partly or wholly) replace the halogenated hydrocarbon as blowing agent in the standard foam formulations.

It was recognized that water, functioning as a reactant forming carbon dioxide ($CO_2$) which acts as a chemical blowing agent, might replace the objected halogenated hydrocarbons. For example, European patent application published under No. 0,358,282 discloses foam formulations useful in the preparation of soft flexible polyurethane foam comprising water which is added as a replacement for chlorofluorocarbons. The reaction between the isocyanate and water produces carbon dioxide gas.

SUMMARY OF THE INVENTION

The present invention provides a water-blown foam which could be molded at a 1.9 minimum in-place density and which would exhibit flowability and dimensional stability comparable to a CFC-blown system of the same density.

The invention relates to the production of a rigid foam made from reacting an organic isocyanate with a mixture of polyols, water, surfactants, catalysts, and other additives such as flame retardants, fillers, and viscosity modifiers. The sole blowing agent is carbon dioxide formed by the reaction of water and isocyanate. The ratio between the isocyanate and hydroxyl groups (including water) is between 100 and 200. The polyol mixture used as the base of the formulation consists of a polyester polyol with an average functionality of at least 1.6 and a hydroxyl value greater than 200 and/or a polyether polyol with an average functionality of at least 2.0 and a hydroxyl value of at least 200. A polyether polyol with an average functionality of at least 1.6 and a hydroxyl value of less than 120 may also be included in the mixture.

The resultant foams have a free rise density between about 1 and about 2.5 lbs./ft.$^3$, and are useful for pour-in-place and spray applications. Such applications include pipe insulation and a variety of void filling applications such as, for example, residential and commercial insulation, appliance (e.g., refrigerators and freezers) insulation, and also as flotation for boats and other watercraft.

The invention produces low density foams which flow well, are stable and exhibit excellent adhesion to metal and treated thermoplastic substrates. Whereas the previous state-of-the art only allowed for commercially viable foam with a minimum in-place density of about 2.4 lbs./ft$^3$, the present invention enables in-place densities of as low as 1.9 lbs./ft.$^3$ to be achieved. Thus, the invention yields commercially viable foams prepared without chlorofluorcabons having excellent flow and dimensional stability at the desired lower densities, densities unobtainable in prior art foams prepared without chlorofluorocarbons at required flow and dimensional stabilities.

DETAILED DESCRIPTION OF THE INVENTION

The present invention relates to foams suitable for preparing water-blown rigid foams with flow and dimension stability.

The water-blown foams are prepared by contacting a resin blend with an isocyanate. The formulations for preparing water-blown closed cell rigid foam are as follows:

|   | parts by weight |
|---|---|
| 1. a polyester polyol with an average functionality of at least 1.6 and an OH value of at least 200 | 0–100* |
| 2. a polyether polyol with an average functionality of at least 2 and an OH value of at least 200 | 0–100* |
| 3. a polyether polyol with an average functionality of at least 1.6 and an OH value of less than 120 | 0–10* |

*preferred quantities of polyols.

The polyol blend component of the resin may be prepared to contain:

(a) a polyester polyol;

(b) a polyester polyol and a polyether polyol with an average functionality of at least 2 and an OH value of at least 200;

(c) a polyester polyol and a polyether polyol with an average functionality of at least 1.6 and an OH value of less than 120;

(d) a polyether polyol with an average functionality of at least 2 and an OH value of at least 200;

(e) a polyether polyol with an average functionality of at least 2 and an OH value of at least 200 and a polyether polyol with an average functionality of at least 1.6 and an OH value of less than 120; or (f) a polyester polyol, a polyether polyol with an average functionality of at least 2 and an OH value of at least 200, and a polyether polyol with an average functionality of at least 2 and an OH value of less than 120.

In more preferred embodiments of the invention, the polyol blend will contain between about 50–90 parts by weight of the polyester polyol; in particularly preferred embodiments the polyester polyol will be present in the polyol blend at about 70–80 parts by weight.

In more preferred embodiments of the invention, the polyol blend will contain between about 5–50 parts by weight of a polyether polyol with an average functionality of at least 2 and an OH value of at least 200; a most preferred embodiment will contain between about 10 and 30 parts by weight of this polyol. The polyether polyol with an average functionality of at least 1.6 and an OH value of less than 120 will be present in more preferred embodiments at between about 5–10 parts by weight.

The other components of the resin composition are water about 2.0–8.0 parts by weight, surfactant, about 0–5.0 parts by weight, amine catalyst, about 0–7.0 parts by weight, and isocyanate catalyst, about 0–5.0 parts by weight.

Water is added to the polyol blend as required to control the density of the resultant foam. A most preferred amount of water is between about 5 and 8 parts by weight.

The above resin composition is reacted with an organic isocyanate with an average functionality of at least 2.0 at an NCO/OH ratio between about 100 and 200 to produce the foam.

The resin blend and isocyanate are mixed with commercially available equipment. The resulting foam is suitable for pour-in-place and spray applications for rigid insulation, void-filling, and structural uses such as appliances, recreational products, and composite structures.

By OH value is meant hydroxyl value, a quantitative measure of the concentration of hydroxyl groups, usually stated as mg KOH/g, i.e., the number of milligrams of potassium hydroxide equivalent to the hydroxyl groups in 1 g of substance.

By NCO/OH is meant the molar ratio of hydroxyl groups (including those contributed by water) to isocyanate groups in the reaction between the polyol blend and the polyisocyanate.

By functionality is meant the number of reactive groups, e.g., hydroxyl groups, in a chemical molecule.

Examples of polyether polyols suitable in the present invention are alkoxylated diols, triols and higher OH or amino-functional starting materials, such as propoxylated mono- or diethylene glycol, propoxylated glycerol, propoxylated pentaerythritol, propoxylated sorbitol, etc. Other examples of suitable polyols are polyols prepared by ethoxylating or ethoxylating/propoxylating said starting materials. The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. No. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Fritsch, Interscience Publishers, New York, London, Vol. I, 1962, pages 32–42 and 44–54, and Volume II, 1964 pages 5–6 and 198–199; and in Kunstoff-Handbuch, Vol. VII, Vieweg-Hochtlen, Carl Hanser Verlag, Munich, 1966, pages 45–71.

Examples of polyisocyanates useful in the process of preparing polyurethane foams are well-known in the art, and are selected from, for instance, aliphatic, cycloaliphatic, and preferably aromatic polyisocyanates; and combinations thereof. Representatives of these types are diisocyanates such as 2,4-toluene diisocyanate, 2,6-toluene diisocyanate, mixtures of 2,4- and 2,6-toluene diisocyanate, 1,5-naphthene diisocyanate, 2,4-methoxyphenyl diisocyanate, 4,4'-diphenylmethane diisocyanate, 4,4'-biphenylene diisocyanate, 3,3'-dimethoxy-4,4'-biphenylene diisocyanate, 3,3'-dimethyl-4,4'-biphenylene diisocyanate, and 3,3'-dimethyl-4,4'-diphenylmethane diisocyanate; triisocyanates such as 4,4'4"-triphenylmethane triisocyanate, and 2,4,6-toluene triisocyanate; and the tetraisocyanates such as 4,4'-dimethyl-2,2',5,5'-diphenylmethane tetraisocyanate; and polymeric isocyanates such as polymethylenepolyphenylene polyisocyanate.

In order to form the polyurethane foam, a catalyst useful in preparing foams is employed in the usual manner. Suitable catalysts that may be used are described in European Patent Application No. 0,358,282, and include: tertiary amines such as, for example triethytenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyl-diethylamine, dimethylbenzylamine, dimethylcyclohexylamine, and the like.

One skilled in the art will recognize that modifications may be made in the present invention without deviating from the spirit or scope of the invention. The invention is illustrated further by the following examples which are not to be construed as limiting the invention or scope of the specific procedures described herein.

EXAMPLE 1

General Procedures for Making Water-blown Foams

Three five-gallon pails of resin blend were prepared by weighing into each:

| | |
|---|---|
| Stepanpol ®PS-2502A | 15000 g |
| Stepanpol ®PE-3603 | 3000 g |
| Stepanpol ®PE-3708 | 2000 g |
| Water | 1100 g |
| Dabco DC5357 | 400 g |
| DMAEE | 200 g |
| Dabco K-15 | 400 g |

The pails were mixed on a roller until a uniform mixture was obtained. The resin blend was added to the resin storage tank of a Cannon H-100 motoring machine. The isocyanate storage tank contained Mondur MR. The machine was set up with the following process parameters:

| | |
|---|---|
| Resin tank pressure | 20 psi |
| Isocyanate tank pressure | 20 psi |
| Resin temperature | 90 °F. |
| Isocyanate temperature | 90 °F. |
| Resin output | 318 g/sec. |
| Isocyanate output | 589 g/sec. |
| Mixhead | Cannon L-18 |
| Resin orifice | 3 mm |
| Isocyanate orifice | 3 mm |
| Resin pressure | 2000 psi |
| Isocyanate pressure | 2000 psi |

A 0.35 second shot was dispensed into a Lily IT10 paper cup. The following data was recorded:

| | |
|---|---|
| Cream time | 4 seconds |
| Gel time | 28 seconds |
| Cup density | 1.54 lbs./ft.$^3$ |
| Free Rise Density | 1.25 lbs./ft.$^3$ |

A 0.58 second shot was dispensed into a 15"×15"×4" mold lined with polyethylene for release purposes. The following physical properties were measured:

| | |
|---|---|
| Overall density | 2.33 lbs./ft.$^3$ |
| Core density | 1.93 lbs./ft.$^3$ |
| Compressive strength | |
| parallel | 27.0 psi |
| perpendicular | 18.4 psi |
| K-factor, initial | 0.160 BTU in./hr. ft.$^2$ °F. |
| Shear strength | 18.8 psi |
| Tensile strength | 37.8 psi |
| Closed cell content | 96.1 % |
| Dimensional stability | |
| 28 days @ −20° F. | 0.17 % vol. chg. |
| 28 days @ 158° F. | 0.69 % vol. chg. |
| 28 days @ 158° F./100% r.h. | 5.17 % vol. chg. |

| Variations in Foam Properties | | | |
|---|---|---|---|
| Sample: | 1 | 2 | 3 |
| Stepanpol ®PS-2502A | 75 | 75 | 80 |
| Stepanpol ®PE-3603 | 25 | 15 | — |
| Stepanpol ®PE-3708 | — | 10 | 10 |
| Poly G 85-36 | — | — | 10 |
| Water | 7.0 | 5.5 | 7.0 |
| Dabco DC5357 | 2.0 | 2.0 | 2.0 |
| Niax A-1 | 0.5 | — | — |
| DMAEE | — | 1.0 | 1.5 |
| Dabco K-15 | 2.0 | 2.0 | — |
| Mondur MR | 223 | 201 | 179 |
| Cream time, sec. | 15 | 15 | 17 |
| Gel time, sec. | 45 | 45 | 47 |
| Cup density, lbs. ft.$^3$ | 1.40 | 1.60 | 1.40 |
| Free Rise density, lbs. ft.$^3$ | 1.10 | 1.30 | 1.10 |

Sample 1 illustrates a low density formulation which is reacted at a high NCO/OH index to improve flow and dimensional stability.

Sample 2 is a slightly higher density foam which incorporates a high functionality polyether to improve dimensional stability.

Sample 3 is a low density foam which is mixed at a 110 NCO/OH index, and incorporates a high functionality polyether to improve dimensional stability and a high molecular weight polyether to improve surface cure.

Stepanpol®PS-2502-A is a modified diethylene glycol phthalate polyester polyol sold by Stepan Company, Northfield, Ill., and having an OH value of about 230–250.

Stepanpol®PE-3603 is an alkoxylated glycerine polyether polyol sold by Stepan Company of Northfield, Ill., and having an OH value of about 350–390.

Stepanpol®PE-3708 is an alkoxylated sucrose polyether polyol sold by Stepan Company of Northfield, Ill., and having an OH of about 365–395.

Poly G 85-36 is an alkoxylated glycerine polyether polyol sold by the Olin Corp. and having an OH value of about 36.

Dabco®DC5357 is a polysiloxane surfactant composed of dimethyl, methyl (polyethylene oxide) siloxane copolymer and is sold by Air Products Corporation of Allentown, Pa.

Niax®A-1 is a catalyst which contains about 70% bis(2-dimethylaminoethyl) ether in 30% dipropylene glycol. This catalyst is sold by Union Carbide Corporation of Danbury, Conn.

DMAEE is dimethylaminoethoxyethanol and is commercially available from Texaco as Texacat®ZR-70.

Dabco®K-15 is a mixture of 75% potassium 2-ethylhexoate and 25% diethyl glycol.

Mondur MR®commercially available from Miles, Pittsburgh, Pa., is polymethylene polyphenyl isocyanate having an isocyanate content of about 31.5%.

From the foregoing, it will appreciated that although specific embodiments of the invention have been described herein for purposes of illustration, various modifications may be made without deviating from the spirit or scope of the invention.

What is claimed is:

1. A water-blown rigid foam comprising a mixture of polyols and an isocyanate, the mixture of polyols comprising a polyester polyol and a polyether polyol,
the polyether polyol having an average functionality of at least 2, and where at least about 60% by weight of the mixture of polyols, based on the weight of the polyols, is a polyester having a functionality of from about at least about 1.6 and an OH value of at least 200,
the foam having a free rise density of from less than about 2.5 pounds/ft$^3$ and exhibiting less than a 5.5% volume change when stored at 158° F. for 28 days.

2. A water-blown foam according to claim 1, wherein the polyester polyol has a functionality of from about 1.6 to 3.

3. A water-blown foam according to claim 1, wherein the polyester polyol has a functionality of from about 1.6 to 2.5.

4. A water-blown foam according to claim 1, wherein the polyester polyol has an OH value of at least 200.

5. A water-blown foam according to claim 2, where the mixture of polyols further comprises from about 0–10% of a polyether polyol having an average functionality of at least 1.6 and an OH value of less than 120.

6. A water-blown foam according to claim 2, having a free rise density of from about 1 to about 2.5 pounds/ft$^3$.

7. A water-blown foam according to claim 2, having a free rise density of from about 1.30 to 2.5 pounds/ft$^3$.

8. A water-blown foam having a minimum in-place density of from about 1 to about 5 lbs./ft.$^3$, and the foam exhibiting less than a 5.5% volume change when stored at 158° F. for 28 days, the foam being prepared by a method comprising the steps of:

(a) preparing a polymer base to contain from about 5–8 parts by weight of water and at least about 60% by weight, based on the weight of the polymer base, of a polyester having a functionality of at least about 1.6; and (b) reacting the polymer base with an isocyanate in the presence of a tertiary amine.

9. A water-blown foam according to claim 8, wherein the polyester polyol has a functionality of from about 1.6 to 3.

10. A water-blown foam according to claim 8, wherein the polyester polyol has a functionality of from about 1.6 to 2.5.

11. A water-blown foam according to claim 10, wherein the polyester polyol has an OH value of at least 200.

12. A water-blown foam according to claim 10, wherein the polyester polyol has an OH value of at least 200.

13. A water-blown foam according to claim 12, where the tertiary amine is selected from the group consisting of bis(2-dimethylaminoethyl) ether and dimethylaminoethoxyethanol.

14. A water-blown rigid foam comprising a mixture of polyols and an isocyanate, where at least about 60% by weight based on the weight of the polyols is a polyester having a functionality of from about at least about 1.6, the foam having a free rise density of from about 1 to about 2.5 pounds/ft$^3$ and exhibiting less than a 5.5% volume change when stored at 158° F. for 28 days, and the foam having a parallel compressive strength of about 25–30 psi and perpendicular compressive strength of about 15–20 psi, and a closed cell content of greater than about 95%.

15. A water-blown foam according to claim 14 having a shear strength of about 15–25 psi and a tensile strength of about 35–40 psi.

16. A process for preparing a water-blown rigid foam having a free rise density of from about 1 to about 2.5 pounds/ft$^3$ and exhibiting less than a 5.5% volume change when stored at 158° F. for 28 days, the process comprising (a) preparing a mixture of polyols and (b) reacting the mixture of polyols with an isocyanate, the mixture of polyols comprising a polyester polyol and a polyether polyol, the polyether polyol having an average functionality of at least 2, and where at least about 60% by weight of the mixture of polyols, based on the weight of the polyols, is a polyester having a functionality of from about at least about 1.6 and an OH value of at least 200.

17. A process according to claim 16, wherein the polyester polyol has a functionality of from about 1.6 to 2.5.

18. A process according to claim 17, wherein the polyester polyol has an OH value of at least 200.

19. A water-blown foam according to claim 18, where the mixture of polyols further comprises from about 0–10% of a polyether polyol having an average functionality of at least 1.6 and an OH value of less than 120.

* * * * *